United States Patent
Twiney et al.

(10) Patent No.: US 7,348,538 B2
(45) Date of Patent: Mar. 25, 2008

(54) METHODS AND SYSTEMS FOR DETECTING PROXIMITY OF AN OBJECT

(75) Inventors: Robert Christopher Twiney, Somerset (GB); Ganesh Chandan Gangadharan, Bangalore (IN)

(73) Assignee: GE Infrastructure Sensing, Inc., Billerica, MA (US)

( * ) Notice: Subject to any disclaimer, the term of this patent is extended or adjusted under 35 U.S.C. 154(b) by 41 days.

(21) Appl. No.: 11/347,711

(22) Filed: Feb. 3, 2006

(65) Prior Publication Data

US 2007/0181784 A1    Aug. 9, 2007

(51) Int. Cl.
*G06M 7/00* (2006.01)
*H01J 40/14* (2006.01)

(52) U.S. Cl. ..................................... 250/221
(58) Field of Classification Search .............. 340/435; 250/342, 353, 221
See application file for complete search history.

(56) References Cited

U.S. PATENT DOCUMENTS

| | | | |
|---|---|---|---|
| 3,143,588 A * | 8/1964 | Donald et al. ............ 356/4.05 |
| 4,251,291 A | 2/1981 | Gomez | |
| 4,976,543 A * | 12/1990 | Scheck et al. ............. 356/624 |
| 5,677,529 A * | 10/1997 | Hofmann et al. ............ 250/221 |
| 6,184,782 B1 * | 2/2001 | Oda et al. ..................... 340/435 |
| 6,324,008 B1 * | 11/2001 | Baldwin et al. ............ 250/353 |
| 6,470,273 B2 * | 10/2002 | Halsted et al. .............. 340/435 |
| 6,820,897 B2 | 11/2004 | Breed et al. | |
| 7,115,871 B1 * | 10/2006 | Tracy et al. ................. 250/342 |
| 2002/0140215 A1 | 10/2002 | Breed et al. | |
| 2004/0058488 A1 | 3/2004 | Arno | |
| 2004/0075544 A1 | 4/2004 | Janssen | |
| 2006/0067378 A1 * | 3/2006 | Rege et al. .................. 374/120 |

* cited by examiner

*Primary Examiner*—Georgia Epps
*Assistant Examiner*—Suezu Ellis
(74) *Attorney, Agent, or Firm*—Mark Conklin, Esq.; Armstrong Teasdale LLP

(57) ABSTRACT

Methods and systems for detecting a proximity of an object are provided. The method includes receiving a first beam of radiation from a first field of view directed onto a first detector and a second beam of radiation from a second field of view directed onto a second detector wherein the second beam is angularly displaced from the first beam by a predetermined amount, generating a first output signal from the first detector correlative to the energy received from the first beam and a second output signal from the second detector correlative to the energy received from the second beam, and outputting a proximity signal indicative of the proximity of an object when a differential between the first and second output signals exceeds a predetermined threshold.

17 Claims, 2 Drawing Sheets

METHODS AND SYSTEMS FOR DETECTING PROXIMITY OF AN OBJECT

BACKGROUND OF THE INVENTION

This invention relates generally to proximity sensors, and more particularly to methods and apparatus for detecting the proximity of an object using a thermal energy sensor.

At least some known systems are used to monitor the surroundings of a vehicle. Such systems are used, for example, for accident prevention, automatic cruise control (ACC), or observation of the blind spot with respect to the visual field of the driver. Radar sensors, Light Detection And Ranging (LDAR) sensors, ultrasound sensors, and video sensors, for example, are known for determining the location of an object which is present in the surroundings of the vehicle. The various sensors, however, require different considerations for the sensors different detection ranges and characteristics. It is known to combine various sensors to accomplish a monitoring task. However, this results in complex systems because of the necessity to combine the various sensor measurement data. Systems using infrared (IR) detectors have used separate IR detectors and mirror systems to define two fields of view on the road. Each detector and mirror is physically independent of the other leading to significant problems in optically aligning the two separate units so that the relative position of the spots on the road are well defined. The relative alignment is difficult and costly to implement due to requiring a precision housing for the separate units.

BRIEF DESCRIPTION OF THE INVENTION

In one embodiment, a method of detecting a proximity of an object includes receiving a first beam of radiation from a first field of view directed onto a first detector and a second beam of radiation from a second field of view directed onto a second detector wherein the second beam is angularly displaced from the first beam by a predetermined amount, generating a first output signal from the first detector correlative to the energy received from the first beam and a second output signal from the second detector correlative to the energy received from the second beam, and outputting a proximity signal indicative of the proximity of an object when a differential between the first and second output signals exceeds a predetermined threshold.

In another embodiment, a proximity sensor includes a first detector configured to receive a first beam of radiation from a first field of view and generate a first output signal correlative to the energy received from the first beam, a second detector configured to receive a second beam of radiation from a second field of view generate a second output signal correlative to the energy received from the second beam wherein the second beam is displaced from the first beam by a predetermined angle, and an electronic circuit configured to output a proximity signal indicative of the proximity of an object when a differential between the first and second output signals exceeds a predetermined threshold.

In yet another embodiment, a system for determining a proximity to an object includes a first detector in optical communication with a first field of view through a first reflector, a second detector in optical communication with a second field of view through a second reflector, and an electronic circuit configured to receive first and second temperature signals from the first and second detectors respectively, the electronic circuit further configured to output a proximity signal indicative of the proximity of an object using the first and second temperature signals.

DETAILED DESCRIPTION OF THE INVENTION

Figure 1:
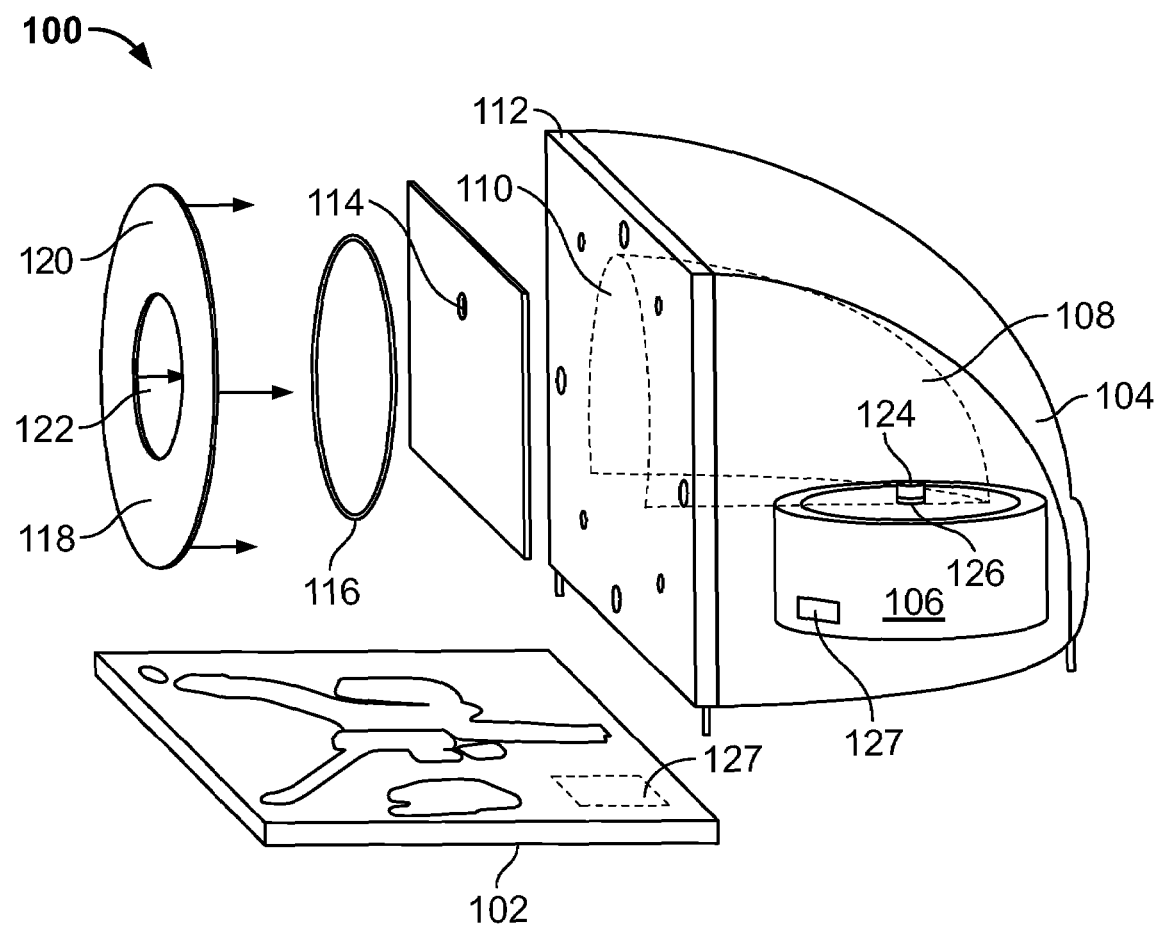
FIG. 1 is a perspective view of a proximity probe system in accordance with an exemplary embodiment of the present invention.

FIG. 1 is a perspective view of a proximity probe system 100 in accordance with an exemplary embodiment of the present invention. System 100 includes a base 102 configured to couple to a sensor housing 104. In the exemplary embodiment, base 102 comprises a printed circuit board 102 configured to communicatively couple to a sensor 106. A first reflector 108 and a second reflector 110 are positioned at least partially within housing 104 and are optically coupled to sensor 106 based on the orientation of first reflector 108 and second reflector 110 with respect to sensor 106. Housing 104 includes a panel 112 that is substantially transparent or translucent to infrared radiation. In an alternative embodiment, panel 112 comprises an opening therethrough. In the exemplary embodiment, a silicon window 114 is coupled to an exterior surface of panel 112 to filter visible wavelength radiation and other stray radiations. In various alternative embodiments, window 114 is fabricated from other visible light filtering materials and materials configured to filter other wavelengths of electromagnetic radiation. A gasket 116 provides a seal and a friction grip to maintain silicon window in place against panel 112. An aperture assembly 118 configured to couple to panel 112 comprises a body 120 and an aperture 122 therethrough.

In the exemplary embodiment, sensor 106 comprises at least two detectors 124 and 126, for example, thermo piles, configured to each receive a beam of infrared radiation from respective fields of view. In the exemplary embodiment, sensor 106 includes an electronic circuit 127 configured to receive signals from detectors 124 and 126 and process them to determine a proximity of an object. In an alternative embodiment, electronic circuit 127 is mounted to or incorporated in base 102. Reflector 108 and reflector 110 are parabolic mirrors that reflect the beams from two specific angles (in one embodiment, sixty-two degrees) apart onto respective detectors 124 and 126. In various other embodiments, reflectors 108 and 110 are arcuate of predetermined curvature. In another embodiment, at least a portion of reflectors 108 and 110 are substantially planar. As, for example, a vehicle passes through the fields of view, a typical signature in the difference output from detectors 124 and 126 as the vehicle moves from one field of view into the other is produced. The fields of view are oriented to give a general reference temperature from one of the fields of view, so that a vehicle only passes through one field of view, not both at the same time. A relative difference in temperature sensed by detectors 124 and 126 when a vehicle is approaching exceeds a predetermined threshold, such as at least one degree Celsius. This temperature difference is effectively captured by the mirror design through a relatively narrow field of view and a relatively large F-number aperture 122. The signal captured through detectors 124 and 126, for example, a thermopile, is processed to determine a differential signal that is compared to the predetermined threshold to generate a warning output signal when the differential signal exceeds the threshold value.

Reflectors 108 and 110 are curved such that respective detectors 124 and 126 are off-focus to enable the beams to be substantially uniformly captured on detectors 124 and 126. Such a configuration acts as averaging filter on detectors 124 and 126 for more reliable data. Reflectors 108 and 110 are oriented off-axis for the parabolic mirror design that enables reflectors 108 and 110 to be manufactured as single piece to facilitate reducing errors from dislocation with respect to detectors 124 and 126.

In the exemplary embodiment, the mirror design definitions for reflectors 108 and 110 are:

$$Sag = \frac{cr^2}{1 + \sqrt{1 - (1+k)c^2 r^2}}, \text{ where}$$

c represents,
k conic=−1,
r radial coordinate=$\sqrt{x^2 + y^2}$ $$Sag = z = \frac{x^2 + y^2}{20}$$

In the exemplary embodiment, four boundary points define the surface limits for reflector 108:
X 2 Y 5, X −10 Y 5, X −6 Y 14, X −4 Y 14, wherein reflector 108 is tilted in x by +90° and y by +31 deg, position is: X −1.125 mm, Y 4.150 mm, Z 1.100 mm
Focal point is X 1.45 mm, Y −0.14 mm, Z 1.1 mm
Also, four boundary points define the surface limits for reflector 110:
X −2 Y 5, X 10 Y 5, X 6 Y 14, X 4 Y 14, wherein reflector 110 is tilted in x by +90 and y by −31 deg, position is: X 1.125 mm, Y 4.150 mm, Z 1.100 mm
Focal point is X −1.45 mm, Y −0.14 mm, Z 1.1 mm
All the dimensions are with respect to (0,0) being at the center of the detectors 124 and 126.

Reflectors 108 and 110 are fabricated such that detectors 124 and 126 are just off focus, permitting the respective beam energy to be uniformly distributed on the thermopile of detectors 124 and 126. This acts as averaging filter on the matrix for more reliable data. Reflectors 108 and 110 are oriented off axis with respect to the beams of radiation passing through aperture 122. The off axis parabolic mirrors design of reflectors 108 and 110 permits manufacture as single piece incorporating both reflectors 108 and 110 in fixed orientation with respect to each other facilitating reducing errors associated with a dislocation with respect to a respective thermopile. In the exemplary embodiment, mounting of detectors 124 and 126 into a single package and the formation of reflectors 108 and 110 from one member and then direct mounting reflectors 108 and 110 to the package comprising detectors 124 and 126 facilitates minimizing of relative misalignment.

Figure 2:
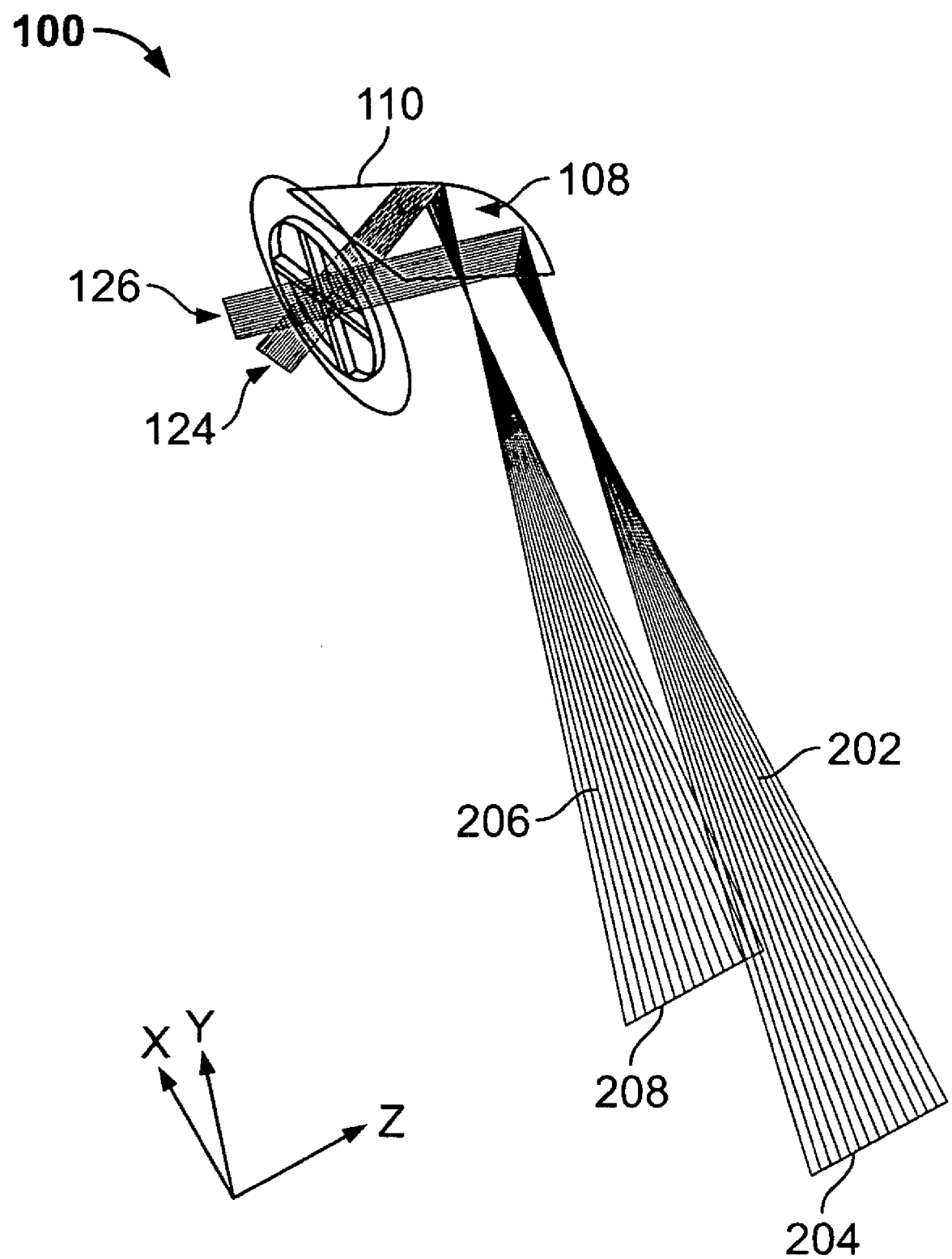
FIG. 2 is a three dimensional perspective view of proximity probe system shown in FIG. 1.

FIG. 2 is a three dimensional perspective view of proximity probe system 100 (shown in FIG. 1). A first beam of radiation 202 from a first field of view 204 is reflected towards detector 126 by reflector 108. The beam arrives at detector 126 off focus such that the energy of beam 202 is substantially uniformly distributed across detector 126 to average the energy received and facilitate improving reliability of the beam information received. Similarly, a second beam of radiation 206 from a second field of view 208 is reflected towards detector 124 by reflector 110. The beam arrives at detector 124 off focus such that the energy of beam 206 is substantially uniformly distributed across detector 124 to average the energy received and facilitate improving reliability of the beam information received.

The above-described embodiments of infrared radiation detection proximity sensors provides a cost-effective and reliable means for monitoring the proximity of an object. More specifically, the use of two sensors in one package facilitates minimizing misalignment of the aperture, reflectors and detectors by accurately locating the two fields of view generated by the system and accurately locating the fields of views with respect to each other. This allows a detection algorithm receiving signals from detectors 124 and 126 to reliably detect a vehicle presence by the difference in signal from the two fields of view. As a result, an infrared radiation based proximity detection system is provided that facilitates detecting approaching other vehicles to the sides of a vehicle to alert the driver to prevent accidents.

Exemplary embodiments of infrared detecting systems are described above in detail. The detecting system components illustrated are not limited to the specific embodiments described herein, but rather, components of each detecting system may be utilized independently and separately from other components described herein. For example, the detecting system components described above may also be used in combination with other detecting systems. Proximity of objects includes the detection of people, vehicles, packages, animals, or any other object.

While the invention has been described in terms of various specific embodiments, those skilled in the art will recognize that the invention can be practiced with modification within the spirit and scope of the claims.

What is claimed is:

1. A method of detecting a proximity of an object, said method comprising:
    receiving a first beam of radiation from a first field of view directed onto a first detector and a second beam of radiation from a second field of view directed onto a second detector wherein the second beam is angularly displaced from the first beam by a predetermined amount wherein the received beams of radiation are received at the detectors off focus;
    generating a first output signal from the first detector correlative to the energy received from the first beam and a second output signal from the second detector correlative to the energy received from the second beam; and
    outputting a proximity signal indicative of the proximity of an object when a differential between the first and second output signals exceeds a predetermined threshold.

2. A method in accordance with claim 1 further comprising reflecting the first and second beams through a first and a second respective mirror.

3. A method in accordance with claim 1 further comprising directing the first and second beams to the first and the second detectors respectively using a respective parabolic mirror.

4. A method in accordance with claim 1 wherein receiving a first beam of radiation from a first field of view directed onto a first detector and a second beam of radiation from a second field of view directed onto a second detector comprises receiving the respective beams of radiation at the detectors such that the beam energy is substantially uniform across each respective detector.

5. A proximity sensor comprising:
a first detector configured to receive a first beam of radiation from a first field of view wherein the first beam of radiation is received off focus at the first detector and to generate a first output signal correlative to the energy received from said first beam;
a second detector configured to receive a second beam of radiation from a second field of view wherein the second beam of radiation is received off focus at the second detector and to generate a second output signal correlative to the energy received from said second beam wherein said second beam is displaced from said first beam by a predetermined angle; and
an electronic circuit configured to output a proximity signal indicative of the proximity of an object when a differential between the first and second output signals exceeds a predetermined threshold.

6. A proximity sensor in accordance with claim 5 wherein said first and second detectors are formed at least one of on a single substrate and within the same package.

7. A proximity sensor in accordance with claim 5 wherein said electronic circuit and said first and second detectors are formed at least one of on a single substrate and within the same package.

8. A proximity sensor in accordance with claim 5 wherein said second beam is displaced from said first beam by an angle of approximately sixty-two degrees.

9. A proximity sensor in accordance with claim 5 wherein said first detector is configured to receive the first beam of radiation from the first field of view that includes an ambient temperature and said second detecto is configured to receive the second beam of radiation from the second field of view that includes a temperature of a proximate object.

10. A proximity sensor in accordance with claim 5 further comprising:
a first parabolic mirror configured to direct said first beam of radiation towards said first detector; and
a second parabolic mirror configured to direct said second beam of radiation towards said second detector.

11. A proximity sensor in accordance with claim 10 wherein said first parabolic mirror and said second parabolic mirror are fabricated off axis with respect to the beams of radiation as a unitary member.

12. A system for determining a proximity to an object, said system comprising:
a first detector in optical communication with a first field of view through a first reflector wherein a first beam of radiation in the first field of view is off focus at the first detector;
a second detector in optical communication with a second field of view through a second reflector wherein a second beam of radiation in the second field of view is off focus at the second detector; and
an electronic circuit configured to receive first and second temperature signals from said first and second detectors respectively, said electronic circuit further configured to output a proximity signal indicative of the proximity of an object using the first and second temperature signals.

13. A system in accordance with claim 12 wherein said first and second detectors are formed at least one of on a single substrate and within the same package.

14. A system in accordance with claim 12 wherein said second beam is displaced from said first beam by an angle of approximately sixty-two degrees.

15. A system in accordance with claim 12 wherein said first detector is configured to receive the first beam of radiation from the first field of view that is indicative of an ambient temperature and said second detector is configured to receive the second beam of radiation from the second field of view that is indicative of a temperature of a proximate object.

16. A system in accordance with claim 12 wherein said first reflector comprises a first parabolic mirror configured to direct said first beam of radiation towards said first detector; and said second reflector comprises a second parabolic mirror configured to direct said second beam of radiation towards said second detector.

17. A system in accordance with claim 12 wherein said first and second detectors are formed into a single package, said first and second reflectors are unitarily formed and coupled directly to said single package such that a relative alignment of said first and second detectors and said first and second reflectors is facilitated.

* * * * *